United States Patent [19]
Beckerman

[11] Patent Number: 5,151,638
[45] Date of Patent: Sep. 29, 1992

[54] MOTOR OVERLOAD INDICATING ARRANGEMENT

[75] Inventor: Howard L. Beckerman, Middletown, N.J.

[73] Assignee: Atlas Roll-Lite Door Corporation, Edison, N.J.

[21] Appl. No.: 743,939

[22] Filed: Aug. 12, 1991

[51] Int. Cl.⁵ .............................................. H02P 7/36
[52] U.S. Cl. .................... 318/434; 318/266; 318/469; 318/809; 361/30
[58] Field of Search ............ 318/256, 264, 265, 266, 318/286, 434, 438, 466, 467, 468, 469, 782, 786, 787, 739, 749, 751, 809; 361/23, 30

[56] References Cited

U.S. PATENT DOCUMENTS

| | | |
|---|---|---|
| 3,855,509 | 12/1974 | Wright . |
| 4,174,496 | 11/1979 | McFall et al. ............... 361/97 X |
| 4,187,523 | 2/1980 | Gray ............................ 361/30 |
| 4,413,325 | 11/1983 | Elfner et al. .................. 364/557 |
| 4,451,823 | 5/1984 | Penn et al. .................... 340/648 |
| 4,703,387 | 10/1987 | Miller .......................... 361/79 |
| 4,853,605 | 8/1989 | Matsuo et al. ................ 318/729 |
| 4,937,561 | 6/1990 | Sasaki et al. .................. 340/646 |
| 5,038,091 | 8/1991 | Bashark ........................ 318/809 |

Primary Examiner—Bentsu Ro
Attorney, Agent, or Firm—David L. Davis

[57] ABSTRACT

An arrangement for detecting a motor overload condition by examining the phase angle relationship between the motor voltage and current. As the load increases, the phase angle difference approaches zero. By measuring the zero crossings of the voltage and current and providing a signal representative of the time difference between these crossings, the phase angle relationship is determined and, accordingly, so is the motor load. Specifically, a saturable ferromagnetic core is utilized to detect the current zero crossings.

9 Claims, 2 Drawing Sheets

MOTOR OVERLOAD INDICATING ARRANGEMENT

BACKGROUND OF THE INVENTION

This invention relates to motor control systems and, more particularly, to an arrangement for use in conjunction with such a system for indicating a motor overload condition.

When the load on a motor driven by an alternating current is mechanically varied, it can cause an overload condition which can damage the motor. Such overload condition may be an indication of a mechanical jamming of a moving element driven by the motor, which jamming can result in damage to the element driven by the motor or to the obstruction causing the jam, as well as damage to the motor itself. This is particularly relevant to motor driven doors, such as garage doors, which are subject to encountering obstructions in their path of travel while closing. It is therefore a primary object of this invention to provide an arrangement for detecting such a jamming by measuring the loading on the motor.

It is a more specific object of this invention to provide such an arrangement which is accurate and reliable independent of motor size, amperage, voltage or wattage.

It is another object of this invention to provide such an arrangement in conjunction with a door operator which is so arranged that jams are automatically released after being detected.

SUMMARY OF THE INVENTION

In accordance with the present invention, motor load is detected by examining the phase angle relationship between the motor voltage and current. As the load increases, the phase angle difference approaches zero. By measuring the zero crossings of the voltage and current and providing a signal representative of the time difference between these crossings, the phase angle relationship is determined and, accordingly, so is the motor load. To detect the zero crossing of the current, a saturable ferromagnetic core is utilized. By utilizing such a device, a number of advantages are attained. Thus, for example, any size motor can be used, electromagnetic noise is virtually eliminated, and complete high voltage to low voltage isolation is effected.

In accordance with an aspect of this invention, upon detection of an overload condition, the motor is stopped and then reversed for a predetermined time to clear any jam.

In accordance with another aspect of this invention, since the starting of a motor creates an overload condition, as defined by this invention, the inventive arrangement includes a provision for ignoring the detection of an overload condition for a predetermined time after the motor is started, until the motor armature is synchronized with the magnetic energy travelling through the field windings.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
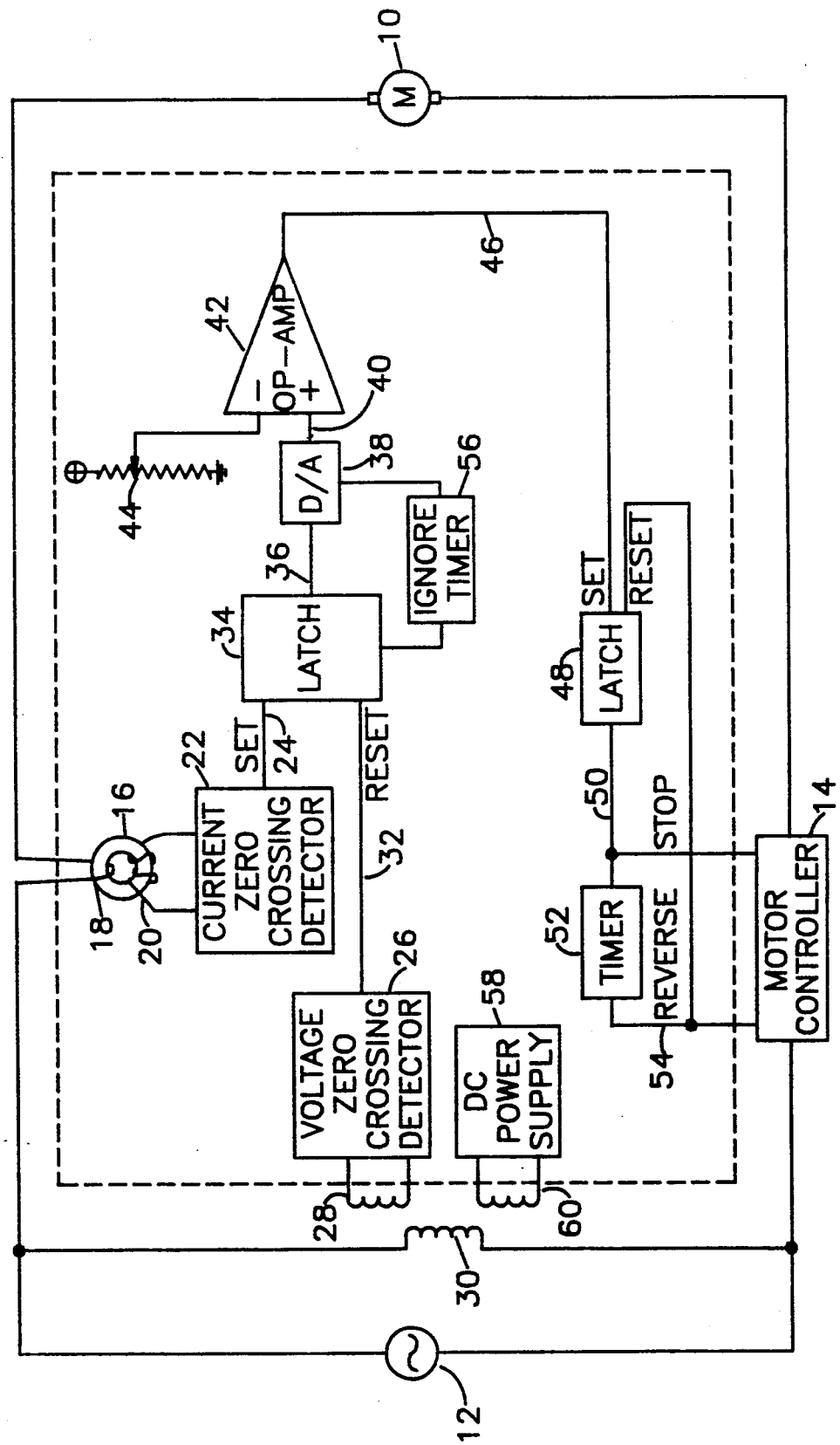
FIG. 1 is a block diagram of an arrangement constructed in accordance with the principles of this invention.

As an AC motor goes from a no load condition to a fully loaded condition, its amperage, voltage and phase angle relationship change. In the case of an unloaded motor, the amperage can reach seventy per cent of the fully loaded amperage, whereas the true wattage will be only five per cent of the wattage of the motor when fully loaded. This discrepancy is due to the phase angle relationship between the current and voltage of the motor. As a load is applied to the motor, the phase angle shift between the voltage and the current will decrease with increasing load. When the motor is operating in its fully loaded condition, the voltage and current are almost completely in phase. With some AC motors, the amplitude of the current may actually decrease as the motor becomes fully loaded. Accordingly, the measurement of motor current cannot be used as a reliable indicator of motor loading.

The measurement of wattage will vary from motor to motor, this being affected by such factors as motor horse power, heat losses in the motor windings due to wire resistance, and current induced heat. Since it is an object of this invention to measure relative motor loading on any size motor, the measurement of motor wattage can therefore not be utilized.

It has been determined that measuring changes in the phase angle relationship between the voltage and the current of the motor will give a consistent and reliable indication of relative motor loading. Accordingly, this invention measures the difference in time between the voltage zero crossing point and the current zero crossing point to derive the relative motor loading.

Conventionally, in order to sense the current zero crossing, current transformers or resistance shunts were utilized. However, using these devices required that the size and value of the detectors be changed to accommodate different size motors. Furthermore, motors generate relatively large amounts of electromagnetic noise, and such noise interferes with high accuracy measurements.

In order to overcome these disadvantages, an easily saturable ferromagnetic core with a search winding is utilized to detect the rotation of the magnetic domains within the core. This is known as the Barkhausen effect. Once they are rotated, the magnetic domains all share the same parallel magnetic axis and the core is saturated. When the core is saturated, any increase in current through the main winding of the core cannot further change the domains. In effect, the core memorizes its last state so that removal of the current does not change the domains. Thus, electromagnetic noise does not have any effect on the domains in a fully saturated core. When the current changes its direction, a critical amount of reverse current is required to flip the domains over and resaturate the core in the opposite direction. When this occurs, which is at the current zero crossing point, all the domains flip over at once, which creates an avalanche magnetic pulse picked up by the search winding. Thus, the use of a saturable ferromagnetic core as a current zero crossing detector provides the advantages that electromagnetic noise is virtually eliminated, any horsepower motor can be used, and high voltage to low voltage isolation is provided.

Referring now to FIG. 1, shown therein is a block diagram of a system constructed according to this invention for controlling a single phase AC motor 10. In the particular application depicted herein, the motor 10 is powered from commercially available 60 Hertz source 12 and its operation is controlled by motor controller 14, which may be a commercially available door operator. The current from the source 12 to the motor 10 passes through the saturable core 16 via the main winding 18, which illustratively encompasses only a single turn. The sense winding 20 wrapped around the core 16, illustratively encompassing thirty turns, is connected to the current zero crossing detector 22. The current zero crossing detector 22 is arranged to provide a pulse on the lead 24 whenever the current through the main winding 18 of the core 16 changes direction. The voltage zero crossing detector 26 has as its input the secondary winding 28 of a transformer whose primary winding 30 is connected across the source 12. The voltage zero crossing detector 26 is arranged to provide a pulse on the lead 32 whenever the voltage of the source 12 goes through zero volts.

The leads 24 and 32 function as the set and reset, respectively, inputs to the latch 34. Thus, the output of the latch 34 on the lead 36 is low during the time from voltage zero crossing to current zero crossing and is high during the time from current zero crossing to voltage zero crossing. Under no load conditions of the motor 10, ideally the phase angle of the current lags the phase angle of the voltage by 90°. As the motor 10 becomes loaded, this phase angle difference decreases. Thus, as the motor becomes more fully loaded, the high duration of the signal on the lead 36 increases relative the low duration of the signal. In effect, the signal on the lead 36 is a pulse width modulated square wave which can be utilized to provide a measure of motor load.

The signal on the lead 36 is applied as an input to the digital to analog converter 38 which derives from the pulse width modulated square wave signal on the lead 36 a voltage on the lead 40 which is representative of the high duration percentage of the pulse on the lead 36. This voltage is applied to the non-inverting input of the operational amplifier 42. Since a motor operating under no load conditions results in a fifty percent duty cycle signal on the lead 56 (because of the 90° phase angle difference between the current and voltage), the inverting input of the operational amplifier 42 is connected to a voltage divider 44 in order to cancel out the no load portion of the voltage on the lead 40.

The output of the operational amplifier 42 on the lead 46 is applied as the set input to the latch circuit 48. The latch circuit 48 is arranged so that when the voltage at its set input on the lead 46 exceeds a predetermined threshold, the latch is set. This predetermined threshold corresponds to the relative loading of the motor 10 at which it is desired to take corrective action. When the latch circuit 48 is set by the signal on the lead 46, its output on the lead 50 provides a stop signal to the motor controller 14. The motor controller 14 is then operative to remove power from the motor 10. At the same time, the signal on the lead 50 initiates operation of the timer 52. The timer 52 is arranged to time a first predetermined interval and then provide a signal on the lead 54. The signal on the lead 54 is applied as a reverse signal to the motor controller 14 to cause the motor controller 14 to operate the motor 10 for a second predetermined interval in a reverse direction, so as to clear any jam. At the same time, the signal on the lead 54 is applied as a reset signal to the latch circuit 48.

When a motor is started, it must overcome the initial inertial loading presented by the mass of the armature and its distance from the center of rotation. In addition, the inertia of the load being driven must be overcome. Counteracting this, the armature of the motor is driven to synchronize with the magnetic energy travelling through the field windings, and tremendous power, equivalent to up to five times full load torque, will be developed until synchronization lock is achieved. During this time, any overload indication must be ignored. Accordingly, there is provided a timer circuit which responds to the initiation of motor current and prevents the digital to analog converter 38 from developing a voltage on the lead 40 for a predetermined period of time after the initiation of motor current so as to allow motor synchronization to occur.

To power the circuitry described above, a DC power supply 58 is provided. The power supply 58 may have as its input the secondary winding 60 of the transformer having the primary winding 30.

Figure 2:
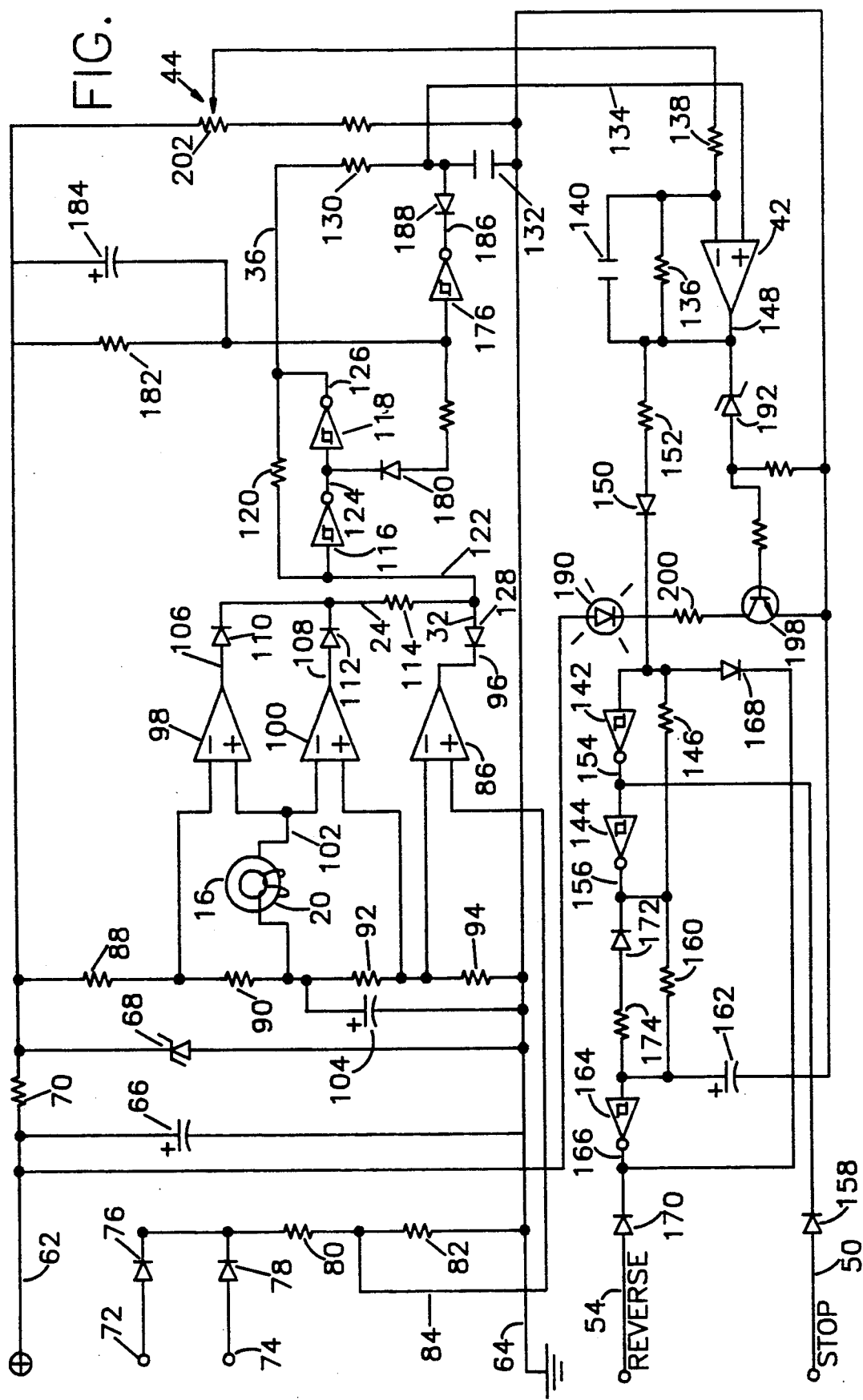
FIG. 2 is a detailed schematic circuit diagram of exemplary circuitry constructed according to this invention.

FIG. 2 illustrates exemplary circuitry for implementing the block diagram shown within the broken line in FIG. 1. A DC voltage from the power supply 58 in the range from about fifteen to about forty volts is applied across the leads 62 and 64. This voltage is filtered by the capacitor 66 and regulated to twelve volts by the Zener diode 68 through the dropping resistor 70.

The secondary winding 28 (FIG. 1) is connected across the terminals 72 and 74. This is an AC voltage, illustratively in the range from about fifteen to about forty volts. This AC voltage is full wave rectified by the diodes 76 and 78 and reduced in voltage by the resistors 80 and 82. The reduced voltage AC signal on the lead 84 is connected to the non-inverting input of the operational amplifier 86. The inverting input of the operational amplifier 86 is connected to a point on the string of voltage dropping resistors 88, 90, 92 and 94 where the voltage is approximately 1.1 volts. This fixed voltage of 1.1 volts is compared with the voltage on the lead 84 by the operational amplifier 86 and the output of the operational amplifier 86 on the lead 96 accordingly goes low each time the AC voltage on the lead 84 approaches zero and goes high each time that voltage is above zero. The operational amplifier 86 therefore functions as a voltage zero crossing detector.

To determine the current zero crossings, the sense winding 20 of the saturable ferromagnetic core 16 is connected at one end to the voltage string made up of the resistors 88, 90, 92 and 94, and at its other end is connected to the non-inverting input of the operational amplifier 98 and the inverting input of the operational amplifier 100. The sense winding 20 provides a positive pulse on the lead 102 each time the motor current changes polarity in a first direction and provides a negative pulse on the lead 102 each time the motor current changes polarity in a second direction. The values of the resistors 88, 90, 92 and 94 are selected to provide fixed reference voltages for the operational amplifiers 98 and 100 which are 0.030 volts above and below a central node point, which is filtered by the capacitor 104. The operational amplifiers 98 and 100 ar ⓡused as comparators whose outputs on the leads 106 and 108, respectively, are biased low with no input. When there is a positive pulse on the lead 102, the lead 106 goes momentarily high. When there is a negative pulse on the lead 102, the lead 108 goes momentarily high. Thus, whenever the motor current changes polarity, a positive pulse appears on the lead 24.

Deriving a voltage representing the phase angle difference between the motor current is accomplished in two steps. The first step is the generation of a phase angle difference pulse initiated by the current zero crossing pulse on the lead 24 and terminated by the voltage zero crossing pulse on the lead 32. The second step is to convert that pulse into a DC voltage. Accordingly, whenever there is a pulse on either the lead 106 or the lead 108, the diodes 110 and 112, respectively, conduct the pulse through the resistor 114 to the input of a latch circuit. This latch circuit consists of two Schmitt trigger inverters 116 and 118, with a feedback resistor 120. Thus, when a positive pulse is applied to the lead 122, the lead 124 goes low, and therefore the lead 126 goes high. The high signal on the lead 126 is coupled by the resistor 120 back to the input of the inverter 116, thereby providing a latch function. When the motor voltage goes through zero, the signal on the lead 96 goes low, resetting the latch through the diode 128. The resistor 114 insures that the reset function predominates if both the voltage and the current generate zero crossing pulses at the same time.

The output of the latch on the lead 36 is a pulse width modulated square wave with its high duration equal to the delay from the current zero crossing to the voltage zero crossing and its low duration equal to the delay from the voltage zero crossing to the current zero crossing. This square wave is filtered by the resistor 130 and the capacitor 132 to produce a DC output which can be amplified. In effect, the capacitor 132 is charged during the time that the signal on the lead 36 is high. The voltage on the capacitor 132 is coupled via the lead 134 to the non-inverting input of the operational amplifier 42. The resistors 136 and 138 are preferably chosen so that the amplifier 42 has an effective gain of ten. The capacitor 140 acts as a noise filter.

The voltage divider 44 provides both a sensitivity and offset adjustment function. While the motor is running, the voltage divider 44 is adjusted so that the output of the amplifier 42 will be just below the trigger threshold of the final stage, to be discussed hereinafter. This adjustment cancels out the residual voltage on the capacitor 132 which is approximately five volts for an unloaded motor and can rise up to ten volts on a fully loaded motor. This residual voltage comes about from the duty cycle of the signal on the lead 36 when there is no overload condition.

The voltage at the output of the operational amplifier 42 which signals the occurrence of a defined overload condition is determined by the latch circuit made up of the two Schmitt trigger inverters 142 and 144 coupled by the feedback resistor 146. Because of the Schmitt trigger configuration of the inverter 142, when the output of the operational amplifier 42 on the lead 148 rises above two thirds of the supply voltage (i.e., eight volts), the diode 150 conducts through the resistor 152 to the input of the inverter 142. The output of the inverter 142 on the lead 154 goes low, causing the output of the inverter 144 on the lead 156 to go high. The feedback resistor 146 then causes the input to the inverter 142 to be latched high. In this condition, the low signal on the lead 154 is conducted through the diode 158 to the lead 50, providing a STOP signal to the motor controller 14.

At the same time, a timer including the resistor 160 and the capacitor 162 is started. This timer determines how long the motor will be stopped before a reverse jog is implemented to release the jam. When the capacitor 162 is charged up to eight volts by the high signal on the lead 156, the Schmitt trigger inverter 164 provides a low signal at its output on the lead 166, resetting the latch through the diode 168. The resistor 152 insures that this reset signal predominates over a set signal if both occur at the same time. While the signal on the lead 166 is low, the REVERSE signal is conducted through the diode 170 to the motor controller 14. This signal stays low while the timer including the diode 172, the resistor 174, and the capacitor 162 discharges to the low trigger point of the inverter 164, Which is four volts. When this occurs, the output of the inverter 164 on the lead 166 goes high and stops the reverse jog.

As discussed above, there is an initial period after the initiation of motor current during which overload sensing is to be ignored. Since in a signal phase motor, synchronization can take up to six full line voltage cycles, at 60 Hertz it takes 100 milliseconds and at 50 Hertz it takes 120 milliseconds. To provide for the worst case of synchronization, which is 50 Hertz power with lower than normal line voltage, an ignore time of 200 milliseconds is provided. The timer for generating this initial ignore period is made up of the Schmitt trigger inverter 176, along with the resistor 178, the diode 180, the resistor 182, and the capacitor 184. Before there is any motor current, the lead 124 is latched high. Therefore, the output of the inverter 176 on the lead 186 is low. This keeps the capacitor 132 discharged through the diode 188. Upon initiation of motor current, the latch made up of the inverters 116 and 118 and the resistor 120 starts to change state. Therefore, the lead 124 goes low. This allows the capacitor 184 to begin charging through the resistor 178 and the diode 180. (The capacitor 184 had been kept discharged by the resistor 182.) However, since the voltage across a capacitor cannot change instantaneously, it takes time for the voltage at the input of the inverter 176 to drop sufficiently that the inverter 176 changes state. The component values are chosen so that this time period is 200 milliseconds. When the inverter 176 changes state, the signal at its output on the lead 186 goes high, back biasing the diode 188 and allowing the capacitor 132 to be charged for normal operation of the overload detection function.

To allow the overload detection trigger point to be adjusted, a light emitting diode 190 is provided. As the output of the operational amplifier 42 on the lead 148 approaches the trigger voltage, the Zener diode 192 conducts through the resistors 194 and 196 to the base of the transistor 198. The transistor 198 starts to conduct, illuminating the light emitting diode through the resistor 200. The closer the signal on the lead 148 is to the trigger point, the brighter the light emitting diode 190 glows due to increasing current at the base of the transistor 198 and therefore more current through its collector. The light emitting diode 190 uses unregulated DC voltage on its anode so as not to affect the regulated supply. Adjustment of the trigger point is then effected by means of the potentiometer 202, which is part of the voltage divider 44. The potentiometer 202 is adjusted while the motor is running until the light emitting diode 190 is dimly lit. The light emitting diode 190 will then change brightness as the motor load changes.

Accordingly, there has been disclosed an improved arrangement for indicating a motor overload condition, for effecting stoppage of the motor, and for initiating reversal of the motor to clear a jam. While a preferred embodiment of the present invention has been disclosed herein, it is understood that various modifications and adaptations to the disclosed arrangement will be apparent to those of ordinary skill in the art and it is only intended that this invention be limited by the scope of the appended claims.

I claim:

1. An arrangement for indicating an overload condition of an AC motor, the overload condition being defined when the phase angle difference between the current and voltage within a single phase of the motor decreases below a predetermined threshold, the arrangement comprising:

a saturable ferromagnetic core having a main winding in series with said single phase of the motor so that the motor current of said single phase passes through said main winding and a sense winding arranged to provide a first pulse of a first polarity when said motor current changes polarity in a first direction and a second pulse of a second polarity when said motor current changes polarity in a second direction;

means receiving said first and second pulses for providing a current zero crossing pulse upon receipt of either said first or said second pulse;

means for providing a voltage zero crossing pulse in response to each zero crossing of the motor voltage of said single phase;

means utilizing said current zero crossing pulse and said voltage zero crossing pulse for providing a phase angle difference pulse initiated by each said current zero crossing pulse and terminated by each said voltage zero crossing pulse;

means for deriving a voltage representative of the duration of each said pulse angle difference pulse;

means activated in response to said derived voltage exceeding a predetermined threshold for stopping the motor; and means responsive to activation of said stopping means for reversing the motor for a predetermined time;

said stopping means including a latch circuit and said reversing means being responsive to the setting of said latch circuit for timing a first interval and, after said first interval, reversing the motor for said predetermined time and resetting said latch circuit.

2. An arrangement for indicating an overload condition of an AC motor, the overload condition being defined when the phase angle difference between the current and voltage within a single phase of the motor decreases below a predetermined threshold, the arrangement comprising:

a saturable ferromagnetic core having a main winding in series with the single phase of the motor so that the motor current of said single phase passes through said main winding and a sense winding arranged to provide a first pulse of a first polarity when said motor current changes polarity in a first direction and a second pulse of a second polarity when said motor current changes polarity in a second direction;

means receiving said first and second pulses for providing a current zero crossing pulse upon receipt of either said first or said second pulse;

means for providing a voltage zero crossing pulse in response to each zero crossing of the motor voltage of said single phase;

means utilizing said current zero crossing pulse and said voltage zero crossing pulse for providing a phase angle difference pulse initiated by each said current zero crossing pulse and terminated by each said voltage zero crossing pulse;

means for deriving a voltage representative of the duration of each said pulse angle difference pulse;

means activated in response to said derived voltage exceeding a predetermined threshold for stopping the motor; and timing means for preventing activation of said stopping means for a predetermined time after initiation of motor current.

3. An arrangement for indicating an overload condition of an AC motor, the overload condition being defined when the phase angle difference between the current and voltage within a single phase of the motor decreases below a predetermined threshold, the arrangement comprising:

a saturable ferromagnetic core having a main winding in series with the single phase of the motor so that the motor current of said single phase passes through said main winding and a sense winding arranged to provide a first pulse of a first polarity when said motor current changes polarity in a first direction and a second pulse of a second polarity when said motor current changes polarity in a second direction;

means receiving said first and second pulses for providing a current zero crossing pulse upon receipt of either said first or said second pulse;

means for providing a voltage zero crossing pulse in response to each zero crossing of the motor voltage of said single phase;

means utilizing said current zero crossing pulse and said voltage zero crossing pulse for providing a phase angle difference pulse initiated by each said current zero crossing pulse and terminated by each said voltage zero crossing pulse;

means for deriving a voltage representative of the duration of each said phase angle difference pulse including a first capacitor charged during the duration of each said phase angle difference pulse; and means activated in response to said derived voltage exceeding a predetermined threshold for stopping the motor.

4. The arrangement according to claim 3 wherein said voltage deriving means further includes means for cancelling the effect of residual voltage on said first capacitor which is not related to the load.

5. The arrangement according to claim 4 wherein said voltage deriving means further includes an operational amplifier having a non-inverting input coupled to said first capacitor and said cancelling means includes means for coupling a voltage to an inverting input of said operational amplifier.

6. The arrangement according to claim 5 wherein said voltage coupling means includes an adjustable voltage divider which is settable to vary said predetermined threshold.

7. The arrangement according to claim 6 further including a light emitting diode coupled to the output of said operational amplifier and arranged to emit light at an intensity which is an indication of the magnitude of said derived voltage.

8. The arrangement according to claim 3 further including means for preventing the charging of said first capacitor for a predetermined time after initiation of motor current.

9. The arrangement according to claim 8 wherein said preventing means includes:
a second capacitor arranged to be charged upon the occurrence of each said current zero crossing pulse; and
means responsive to the voltage across said second capacitor being below a predetermined threshold for providing a discharge path for said first capacitor and responsive to the voltage across said second capacitor being above said predetermined threshold for blocking said discharge path.

* * * * *